United States Patent [19]

Schultz et al.

[11] 3,734,159
[45] May 22, 1973

[54] TIRE CHANGING DEVICE

[76] Inventors: William L. Schultz, Box 485; Matthew Schultz, Box 241, both of Red Lake Falls, Minn. 56750

[22] Filed: Aug. 31, 1970

[21] Appl. No.: 68,340

Related U.S. Application Data

[62] Division of Ser. No. 726,414, May 3, 1968, Pat. No. 3,543,829.

[52] U.S. Cl. ................................................. 157/1
[51] Int. Cl. .............................................. B60c 25/00
[58] Field of Search ................ 157/1.22, 1.24, 1.3, 157/1

[56] References Cited

UNITED STATES PATENTS

| | | | |
|---|---|---|---|
| 2,546,988 | 4/1951 | Eberly | 157/1.24 |
| 3,247,883 | 4/1966 | Strang et al. | 157/1.22 |
| 2,201,982 | 5/1940 | Bazarek | 157/1.22 X |
| 2,912,350 | 7/1955 | Henderson | 157/1.22 |
| 2,920,664 | 1/1960 | Lomen et al. | 157/1.24 X |

*Primary Examiner*—Granville Y. Custer, Jr.
*Attorney*—Andrew E. Taylor

[57] ABSTRACT

A pivoted component is mounted on a base and carries an hydraulic motor and a gear train. The component is swung vertically to receive a tubeless tire and wheel and is then swung horizontally for tire removal and replacement thus obviating the lifting on and off the relatively heavy tire and wheel assembly.

1 Claim, 9 Drawing Figures

PATENTED MAY 22 1973 3,734,159
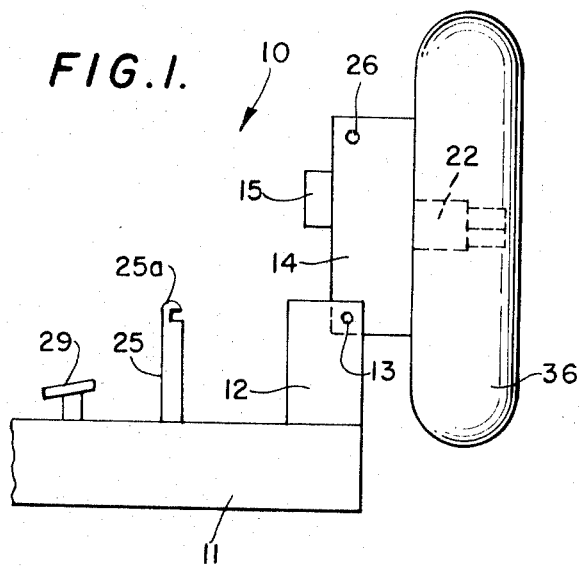
FIG.1.
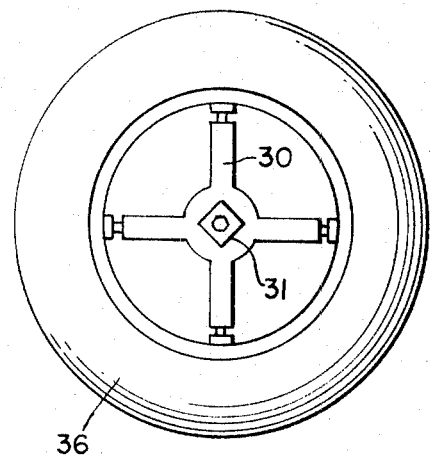
FIG.5.
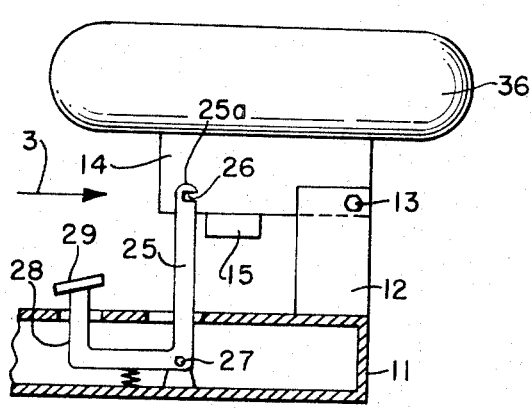
FIG.2.
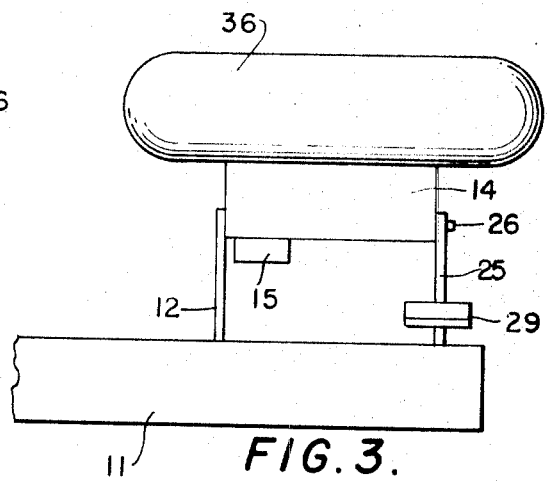
FIG.3.
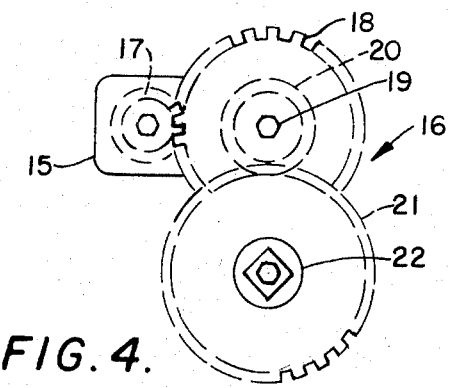
FIG.4.
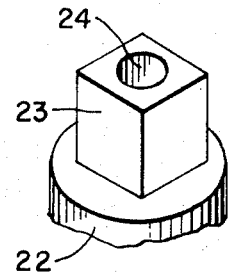
FIG.6. FIG.7.
FIG.8.
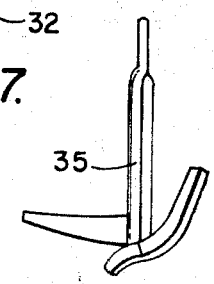
FIG.9.

TIRE CHANGING DEVICE

RELATED APPLICATION

This application is a division of our copending application Ser. No. 726,414 filed May 3, 1968, now U.S. Pat. No. 3,543,829 dated Dec. 1, 1970.

This invention relates to new and useful improvements in tubeless tire changing devices, and the principal object of the invention is to facilitate convenient and expeditious removal of a tire from a wheel after the tire bead has been broken away from the wheel rim.

In particular, the tire changing device of the invention is well suited for use in conjunction with the tire bead breaker of the general type disclosed in the aforementioned U.S. Pat. No. 3,543,829, although it may also be used with a bead breaker of any conventional type.

An important feature of the invention is that it enables a wheel and tire to be placed on the device in a vertical position and thereupon swung to a horizontal position in which the tire removing procedure is performed. This avoids the necessity of lifting and simultaneously turning the wheel and tire to a horizontal position, which can be a difficult task, especially with heavy truck wheels.

With the foregoing considerations in view, and such other objects, purposes, or advantages as may become apparent from consideration of this disclosure and specification, the present invention consists of the invention concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying drawings in which:

FIG. 1 is a side elevational view of the tire changing device with the wheel in a vertical position;

FIG. 2 is a side elevational view thereof, with the base shown in section and the wheel in a horizontal position;

FIG. 3 is an end view, taken in the direction of the arrow 3 in FIG. 2;

FIG. 4 is a diagrammatic illustration of the gearing;

FIG. 5 is a plan view of a wheel and tire with the clamping spider applied to the wheel;

FIG. 6 is an enlarged fragmentary perspective view of the mandrel;

FIG. 7 is a perspective view of the fulcrum member; and

FIGS. 8 and 9 are perspective views of tire tools.

Referring now to the accompanying drawings in detail, the tire changing device of the invention is designated generally by the reference numeral 10 and comprises a supporting base 11 having a pair of spaced upstanding brackets 12 provided on top thereof. A horizontal shaft 13 is supported by these brackets, and a gear case 14 is mounted on the shaft for swinging movement in a vertical plane, as between the position shown in FIG. 1 and that shown in FIG. 2.

A suitable motor 15 is supported by the gear case and drives reduction gearing 16 located within the case. As diagrammatically shown in FIG. 4, such gearing may include a pinion 17 on the drive shaft of the motor 15, meshing with a gear 18 on a countershaft 19 which also carries a pinion 20 meshing with a gear 21 on a mandrel 22.

The mandrel 22 projects upwardly or outwardly from the gear case 14 and, as is best shown in FIG. 6, has a polygonal end portion 23 provided with an axial cylindrical bore 24. It will be understood that when the gear case is in the position shown in FIG. 1, the mandrel projects laterally outwardly therefrom in the horizontal direction. On the other hand, when the gear case is in the position shown in FIGS. 2 and 3, the mandrel is vertical and projects upwardly from the case.

Suitable means may be provided for holding the gear case 14 in the position shown in FIGS. 2 and 3, as for example, a latching lever 25 having a hook-shaped free end 25a engageable with a pin 26 which projects from one side of the gear case. As shown in FIG. 2, the base 11 is hollow and the lever 25 is pivotally mounted in the base as at 27. An extension 28 of the lever projects upwardly from the base and is equipped with a foot pedal 29, so that upon depression of this pedal, the end 25a of the latching lever may be disengaged from the pin 26 and the gear case swung to the position of FIG. 1.

The polygonal end portion 23 of the mandrel 22 is adapted to receive thereon a conventional wheel clamping spider 30 shown in FIG. 5. This spider is provided at the center thereof with a polygonal aperture 31 which fits the polygonal end portion 23 of the mandrel. Thus, when the mandrel is rotated, the spider and the wheel clamped thereby are rotated therewith.

The cylindrical bore 24 in the end of the mandrel removably and rotatably receives a cylindrical shank 32 at the bottom of a fulcrum member 33 shown in FIG. 7. This fulcrum member is substantially U-shaped and is adapted to receive between the sides thereof any one of a number of conventional tire changing tools, for example such as the tools 34, 35 shown in FIGS. 8 and 9 respectively. The tools may also be in the form of simple straight bars, or the like.

When the device is to be used, the gear case 14 is swung to the position shown in FIG. 1 in which the mandrel projects horizontally outwardly from the case. A wheel and tire, designated collectively as 36, in a vertical position may be rolled toward the device and applied to the mandrel. This may be done by manually lifting the wheel, or with leverage assistance of a round bar (not shown) which is passed through the center of the wheel and inserted into the bore 24 of the mandrel, the bar then being moved upwardly to raise the wheel onto the mandrel with a leverage action.

With the wheel and tire in position on the mandrel, the gear case 14 is then swung to the position shown in FIGS. 2 and 3 and is held in that position by the latching lever 25. In that position, the wheel and tire are disposed horizontally, and the clamping spider 30 is applied to the polygonal portion 23 of the mandrel to hold the wheel in place for rotation with the mandrel.

The shank 32 of the fulcrum member 33 is then inserted in the bore 24 of the mandrel and a suitable tire changing tool, such as for example the tool 34, is applied to the fulcrum member with one end of the tool engaging the tire bead which has previously been broken away from the wheel rim. The motor 15 may then be energized so as to rotate the mandrel 22 together with the wheel and tire, while the tire tool is held relatively stationary. This is permitted by rotation of the fulcrum member shank 32 in the bore 24 of the mandrel, and it will be understood that as rotation of the wheel and tire continues through a full circle, the tire bead will be shifted from the inside to the outside of the wheel rim to facilitate removal of the tire from the wheel. In a similar manner, the tire bead may be shifted from the outside to the inside of the wheel rim when a tire is to be mounted on the wheel.

In the instance of mounting a tire on a wheel, when this has been completed, the latching lever 25 may be disengaged from the pin 26 and the gear case 14 swung to the position of FIG. 1, thus permitting the wheel and tire to be easily removed in a vertical position from the mandrel and rolled away.

What I claim as my invention is:

1. In a tire changing device, the combination of a supporting base, a horizontal shaft provided on said base, a gear case mounted on said shaft for swinging movement in a vertical plane, a mandrel rotatable in and projecting outwardly from said gear case, a drive motor supported by the gear case, gearing in said case operatively connecting said drive motor to said mandrel for rotating the same, said gear case with said drive motor being swingable about said shaft between a position wherein said mandrel is horizontal and a position wherein the mandrel projects vertically upwardly from the gear case, said mandrel having a polygonal end portion and being provided in said end portion with an axial cylindrical bore, a wheel clamping spider formed at the center thereof with a polygonal aperture removably receiving the polygonal end portion of the mandrel whereby said spider and a wheel clamped thereby may rotate with the mandrel when said motor is energized, and a tire tool receiving fulcrum member having a cylindrical stem removably and rotatably positioned in said bore of the mandrel, whereby a tire tool applied to said fulcrum member may remain relatively stationary while said spider and a wheel clamped thereby are rotated by said mandrel.

* * * * *